3 Sheets—Sheet 1.

T. BARNES.
Grain-Separator.

No. 203,874. Patented May 21, 1878.

Attest:
Thomas Beech
David Mars

Inventor:
Thomas Barnes
his atty,
Henry Beech.

3 Sheets—Sheet 2

T. BARNES.
Grain-Separator.

No. 203,874. Patented May 21, 1878.

Attest:
Thomas Beech.
Daniel Marr

Inventor:
Thomas Barnes
her attorney
Henry Beech

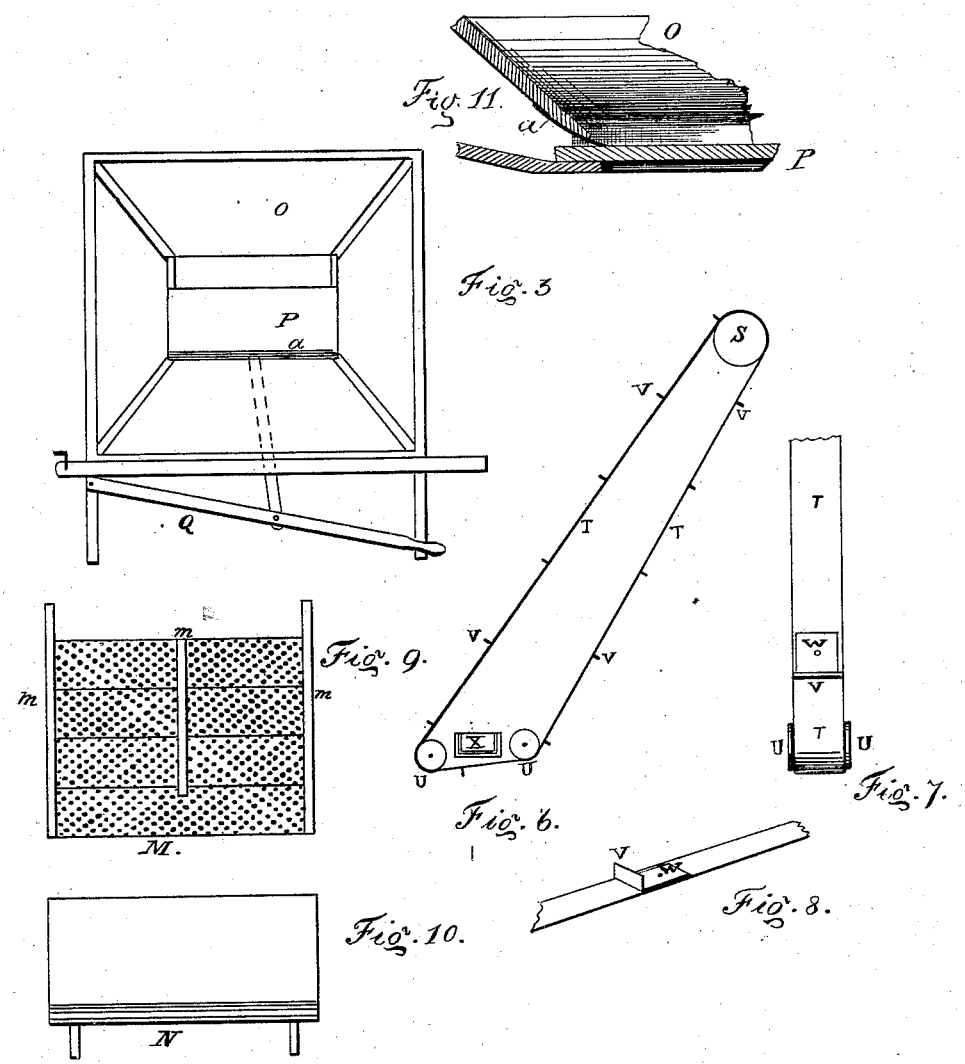

UNITED STATES PATENT OFFICE.

THOMAS BARNES, OF HARWICH TOWNSHIP, KENT COUNTY, ONTARIO, ASSIGNOR TO ROBERT SHOFF, OF LONDON, CANADA.

IMPROVEMENT IN GRAIN-SEPARATORS.

Specification forming part of Letters Patent No. 203,874, dated May 21, 1878; application filed November 8, 1877.

*To all whom it may concern:*

Be it known that I, THOMAS BARNES, of the township of Harwich, in the county of Kent, Province of Ontario, Canada, have invented certain new and useful Improvements on Fanning-Mills; and I hereby declare that the following is a full, clear, and exact description of the same, reference being had to the accompanying drawings.

Figure 2:
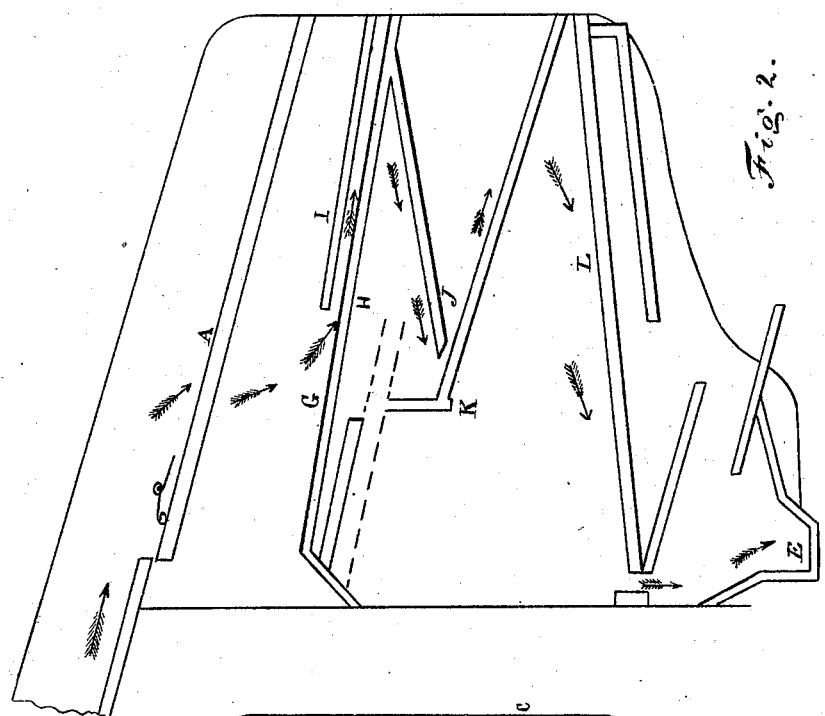
Figure 1:
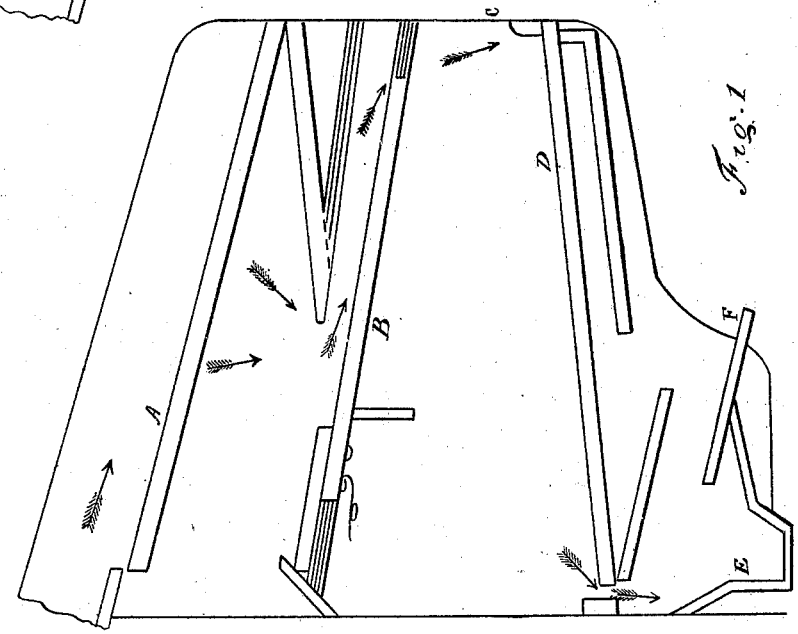
Figure 5:
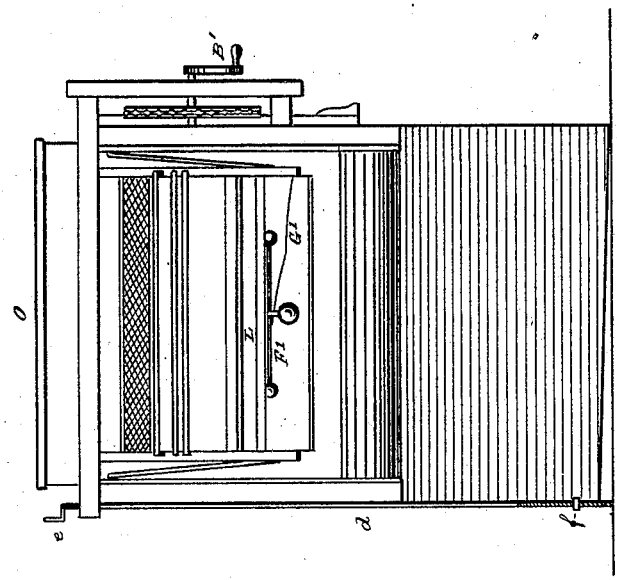
Figure 4:
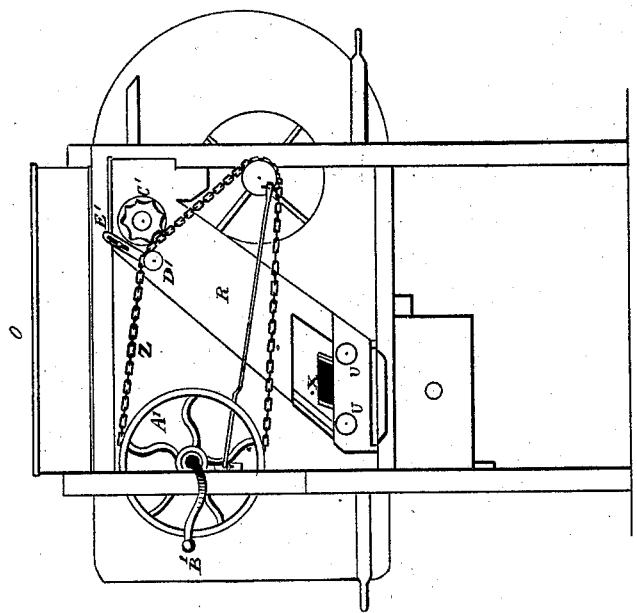

Figure 1 is a section of sieves, &c., used in cleaning. Fig. 2 is a section of sieves, &c., used in separating. Fig. 3 is a top view of hopper. Fig. 4 is a side elevation of mill. Fig. 5 is an end elevation. Figs. 6 to 8 are details of elevator. Figs. 9 and 10 are top views of the riders; Fig. 11, a sectional view of the hopper, showing the elastic scraper.

Like letters refer to like parts in the several figures.

This fanning-mill is intended to operate both as a cleaner and as a separator.

In the first place, as a cleaner, Fig. 1, the grain from the hopper is made to pass through the top sieve A and falls upon the upper gage-board B, passes over the edge in a thin stream, and the wind passing through carries the dirt over the divider C, while the grain falls upon the screen D inside the divider, passing thence, as shown by the arrows, into the spout E, which carries it to the elevator, hereinafter more fully described. While falling from the screen D to the spout E it receives a second blast, blowing the dirt over lower gage-board F into the chess-box.

In the second place, for separating wheat from oats, Fig. 2, the wheat passes through sieve A, as in cleaning, and falls upon a lower shelf of blank zinc, G. This shelf G is a combination of sieve and two plates of zinc, which place the oats upon their sides, the object being to prevent them from passing through the sieve endwise, as they would otherwise do. The wheat will pass through the sieve H, and the oats will pass over the same and be thrown out. The upper blank zinc I is to catch any oats as they fall after they pass half-way and carry them out. The wheat that has fallen through sieve H is carried down by return-board J to inclined sieve K. This sieve is constructed so as to be raised or lowered to any angle by means of springs on one side to accelerate or retard the progress of the oats on their passage out. The wheat then falls upon screen L, and, as shown by the arrows, falls into spout E and receives a blast, the same as in cleaning, when any light dirt will be blown out.

For taking oats from barley the process is similar, with the exception of removing blank zinc and sieves G H I, and placing the rider M, Fig. 9, over sieve A. This rider is constructed as shown at Fig 9—that is, of several strips, M, of perforated zinc, fastened together, side by side, by means of leather strips *m*. Another rider, N, Fig. 10, consisting of one strip or plate of perforated zinc, N, is placed over the elevating-sieve K. The object of these riders is to prevent the oats from turning up on their ends, at the same time assisting the barley, which is a shorter grain, to turn on its end and go through the sieve.

O is the hopper, and P the slide at bottom, which regulates the opening to any distance by means of the movable arm Q. The handle of this arm is always within reach, and the flow of the grain is thus assisted or checked at will.

*a* represents a stationary inclined elastic scraper, located between the rear portion of the hopper and the movable feed-slide, as clearly shown in Fig. 11, for the purpose of preventing the grain getting between said rear portion of the hopper and feed-slide when the latter is moved forward or backward, thus preventing clogging of the same.

R is an elevator, attached at side of mill, the details of which are shown at Figs. 4, 6, 7, 8. S is an upper roller, round which passes the endless band T, passing also at the bottom round the rollers U U, situated as shown.

V V are scrapers, constructed of rubber, and attached to metal strips W W, which are themselves riveted flatly to the band T, as clearly shown at Figs. 7, 8. These scrapers will catch up and carry forward the grain as it is delivered from the spout X.

The elevator is operated by means of chain Z, (passing over driving-wheel A' and driven by crank B',) when engaged by toothed wheel C' on end of upper roller S. It is thrown in and out of gear by means of pulley D', pivoted to slide E'. This slide is attached to side of mill by a set-screw, and, accordingly as it is raised or lowered, the chain Z is engaged with or released from the toothed wheel C', which, as already stated, is itself pivoted to end of upper roller S, driving the endless bands of elevator.

Immediately beneath the permanent screen L is pivoted a double-knobbed pendulum striker or knocker F', constructed as shown in Fig. 5, against which impinges a spring-supporting wire, G. The two upper knobs on horizontal bar of the striker or knocker will rapidly vibrate by the motion of the shaker and frictional contact of the spring-supporting wire, and, striking on the under side of permanent screen, will free it from any accumulations of dirt.

In order to provide for the mill standing perfectly level on uneven floors, such as are usually found in barns, screw-rods $d$, Fig. 5, are fixed at three of the sides, and by turning the crank end $e$ they are screwed up or down in the guards $f$, so as to adapt them to the inequality of the floor.

What I claim as my invention is—

1. The combination, with the hopper O and movable feed-slide P, of the stationary inclined elastic scraper $a$, located between the rear portion of said hopper and said feed-slide, substantially as and for the purpose specified.

2. In a fanning-mill, the combination, with the shaking or vibrating and conveying mechanisms, of the driving mechanism, consisting of the chain Z, toothed wheel C', pulley and slide D' E', and wheel and crank A B', substantially as herein shown and described.

3. The combination, with the shaker and screen L, of the double-knobbed pendulum striker or knocker F' and the spring-supporting wire G, engaging by frictional contact with said striker or knocker, substantially as and for the purpose herein shown and described.

THOMAS BARNES.

Witnesses:
M. H. SIMPSON,
C. P. SIMPSON.